United States Patent
Berding et al.

(10) Patent No.: US 8,031,431 B1
(45) Date of Patent: Oct. 4, 2011

(54) DISK DRIVE HAVING A TOP COVER WITH ANCHOR TABS

(75) Inventors: Keith R. Berding, San Jose, CA (US); Chunjer Chuck Cheng, Saratoga, CA (US); Thomas J. Hitchner, San Martin, CA (US); James Demuth, Bellevue, WA (US); Charles D. Flanigan, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 422 days.

(21) Appl. No.: 12/396,342

(22) Filed: Mar. 2, 2009

(51) Int. Cl.
*G11B 33/14* (2006.01)

(52) U.S. Cl. .................. 360/97.01; 360/97.02
(58) Field of Classification Search .............. 360/97.04
See application file for complete search history.

(56) References Cited

U.S. PATENT DOCUMENTS

| | | | |
|---|---|---|---|
| 5,216,582 A | 6/1993 | Russell et al. | |
| 5,270,887 A | 12/1993 | Edwards et al. | |
| 5,276,577 A | 1/1994 | Brooks et al. | |
| 5,293,282 A * | 3/1994 | Squires et al. | 360/77.08 |
| 5,422,766 A | 6/1995 | Hack et al. | |
| 5,448,433 A * | 9/1995 | Morehouse et al. | |
| 5,559,650 A * | 9/1996 | Repphun et al. | 360/97.02 |
| 5,808,830 A | 9/1998 | Stefansky et al. | |
| 5,936,798 A | 8/1999 | Johnson et al. | |
| 6,256,165 B1 | 7/2001 | Kim | |
| 6,297,928 B1 * | 10/2001 | Hahn et al. | 360/97.01 |
| 6,560,063 B1 | 5/2003 | Keffeler et al. | |
| 6,577,468 B2 | 6/2003 | Daniel et al. | |
| 6,631,049 B2 | 10/2003 | Satoh et al. | |
| 6,646,826 B1 | 11/2003 | Haidari et al. | |
| 6,769,699 B2 | 8/2004 | Seki et al. | |
| 6,850,387 B2 | 2/2005 | Daniel | |
| 7,123,437 B2 | 10/2006 | Bae et al. | |
| 7,420,770 B2 | 9/2008 | Ho et al. | |
| 2006/0034010 A1 | 2/2006 | Abe et al. | |
| 2006/0176610 A1 | 8/2006 | Tsuda et al. | |
| 2007/0008697 A1 | 1/2007 | Choi et al. | |

FOREIGN PATENT DOCUMENTS

WO 02082430 A2 10/2002

* cited by examiner

*Primary Examiner* — Tan T. Nguyen (57) ABSTRACT

A novel disk drive includes a top cover having a plurality of integral anchor tabs extending towards a disk drive base. Each of the plurality of anchor tabs includes a hooking surface that faces the top cover. The disk drive base includes a plurality of retention cavities, each of the retention cavities including a catching surface that faces away from the top cover. Each of the plurality of anchor tabs protrudes into a respective one of the plurality of retention cavities, and may be deformed so that the hooking surface of the anchor tab is in contact with the catching surface of the retention cavity.

23 Claims, 5 Drawing Sheets

DISK DRIVE HAVING A TOP COVER WITH ANCHOR TABS

BACKGROUND OF THE INVENTION

1. Field of the Invention

The present invention relates generally to the field of information storage devices, and more particularly to housings for disk drives.

2. Background of the Art

Information storage devices are used to retrieve and/or store data for computer systems and other consumer electronics products. A magnetic hard disk drive is an example of an information storage device that is especially sensitive to contaminants, and so requires a housing that is unusually adept at preventing the entry of contaminants. Magnetic hard disk drives are also especially sensitive to other conditions of their external environment, including mechanical shocks, externally applied forces and electromagnetic fields, and changes in temperature and/or humidity, etc. Therefore, the housings of disk drives may affect performance, reliability, and lifetime more than the housings of other types of information storage devices.

The top cover is a key component of a disk drive housing, and its means of attachment is of significant consequence. For example, the design and method of attachment of the top cover of a disk drive housing may significantly affect contamination avoidance, electromagnetic shielding, heat transfer/cooling, vibration dampening, and support for internal components such as the spindle to which disks are mounted and the actuator that positions read/write heads.

However, the top cover component, and the manufacturing overhead associated with its fabrication and attachment to the disk drive housing, must meet challenging high-volume manufacturability requirements and cost limitations. Accordingly, there is an ongoing need in the art for improved top covers for disk drive housings, and for improvements in the attachment means for top covers to disk drive housings.

SUMMARY

According to an aspect of the present invention, a novel disk drive is disclosed. The novel disk drive includes a disk drive base, a spindle attached to the disk drive base with a disk attached to the spindle, and a top cover attached to the disk drive base to form a housing that encloses the disk. The top cover has a major surface defining a top cover plane. The top cover includes a plurality of anchor tabs extending away from the top cover plane and towards the disk drive base. Each of the plurality of anchor tabs includes a hooking surface that faces the top cover. The anchor tabs are integral features of the top cover so that the top cover and the plurality of anchor tabs are a single monolithic component having material continuity rather than being an assembly of sub-components. The disk drive base includes a plurality of retention cavities, each of the retention cavities including a catching surface that faces away from the top cover. Each of the plurality of anchor tabs protrudes into a respective one of the plurality of retention cavities, with the hooking surface of the anchor tab being in contact with the catching surface of the retention cavity.

According to another aspect of the present invention, a novel method for assembling a disk drive is disclosed. A disk drive base is provided, and a spindle is attached to the disk drive base. The disk drive base includes a plurality of retention cavities. A top cover is also provided. The top cover has a plurality of anchor tabs that extend away from a plane of a major surface of the top cover. The anchor tabs are integral features of the top cover so that the top cover and the plurality of anchor tabs are a single monolithic component having material continuity rather than being an assembly of sub-components. Each of the plurality of anchor tabs includes a hooking surface that faces the top cover. The top cover is positioned in relative alignment with the disk drive base, with each of the plurality of anchor tabs protruding into a respective one of the plurality of retention cavities, so as to create a housing that at least partially encloses the spindle. Each of the plurality of anchor tabs is deformed so that its hooking surface contacts a catching surface of the respective one of the plurality of retention cavities, the catching surface facing away from the top cover.

DETAILED DESCRIPTION OF EXEMPLARY EMBODIMENTS

Figure 1:
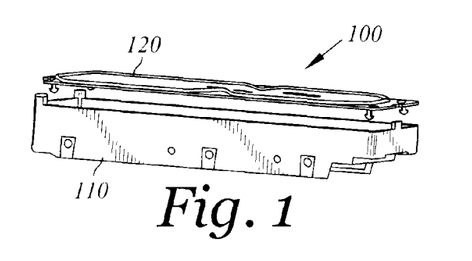
FIG. 1 is an exploded side perspective view of a disk drive according to an embodiment of the present invention.

FIG. 1 is an exploded side perspective view of a disk drive 100 according to an embodiment of the present invention. The disk drive 100 includes a disk drive base 110, a conventional spindle attached to the disk drive base 110 with a conventional disk attached to the spindle, and a top cover 120 attached to the disk drive base 110 to form a housing that encloses the conventional disk. The conventional spindle and conventional disk are internal to the disk drive 100 and so are not visible in the external view of FIG. 1. During assembly, the top cover 120 is positioned in relative alignment with the disk drive base 110, so as to create a housing that at least partially encloses the conventional spindle. The disk drive base 110 and the top cover 120 may be together referred to as the disk drive housing. The disk drive base 110 may be fabricated of aluminum, for example, and the top cover 120 may be fabricated of aluminum or stainless steel, for example.

Figure 2:
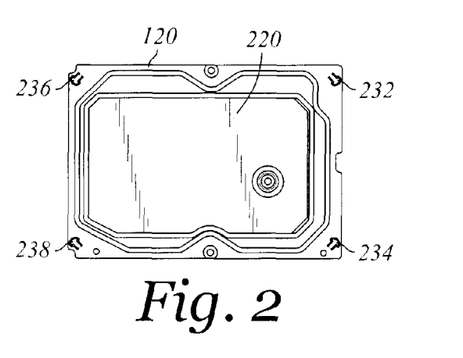
FIG. 2 is a top view of a top cover for a hard disk drive according to an embodiment of the present invention.

FIG. 2 is a top view of the top cover 120. The top cover 120 has a major surface 220 that defines a top cover plane. Also, in the embodiment of FIG. 2, the top cover 120 includes a plurality of undeformed anchor tabs 232, 234, 236, 238 near the corners of the top cover 120. Note that in the embodiment of FIG. 2, each of the anchor tabs 232, 234, 236, 238 is an integral feature of the top cover 120, so that the top cover 120 and the anchor tabs 232, 234, 236, 238 are a single monolithic component having material continuity rather than being an assembly of sub-components. Such integral anchor tabs may be fabricated from the cover by stamping, for example. Before attachment of the top cover 120 to the disk drive base 110, each of the anchor tabs 232, 234, 236, 238 is bent downward to extend away from the top cover plane and towards the disk drive base 110.

Figure 3:
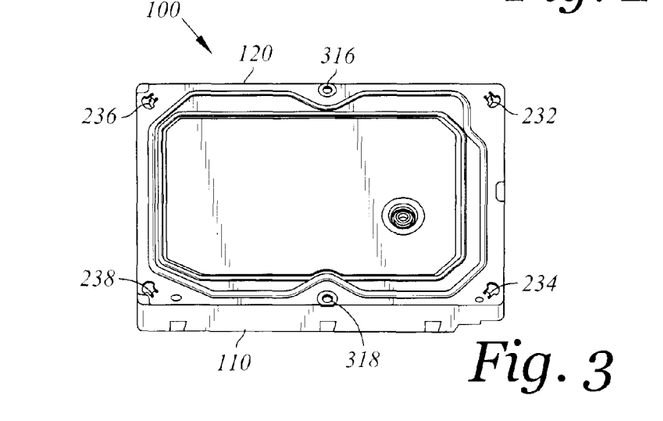
FIG. 3 is a top perspective view of a disk drive according to an embodiment of the present invention.

FIG. 3 is a top perspective view of the disk drive 100 with the top cover 120 attached to the disk drive base 110. Note that in the embodiment of FIG. 3, the top cover is attached to the disk drive base 110 not only by the anchor tabs 232, 234, 236, 238, but also by screw fasteners 316, 318. The combination of screw fasteners and anchor tabs is optional, but may be preferable to enhance the robustness of the attachment, for example to shear forces.

Figure 4:
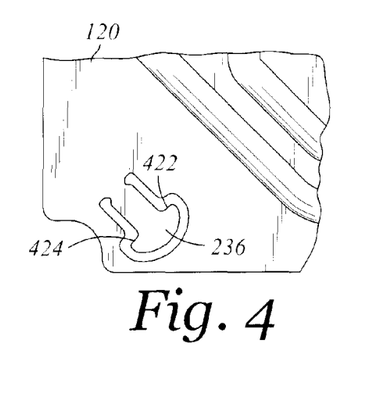
FIG. 4 is a close-up top view of a corner of a top cover for a disk drive, having an anchor tab shown before deformation, according to an embodiment of the present invention.
Figure 5:
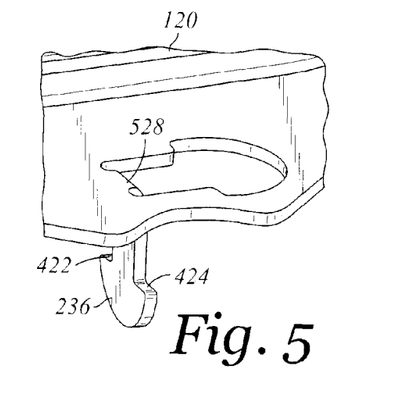
FIG. 5 is a close-up top view of a corner of a top cover for a disk drive, having an anchor tab shown after some deformation, according to an embodiment of the present invention.

FIG. 4 is a close-up view of anchor tab 236 before deformation by bending. By contrast, FIG. 5 is a close-up top view of anchor tab 236 shown after a certain amount of bending deformation. Specifically, in the view of FIG. 5 anchor tab 236 has been deformed by being bent downward to extend away from the top cover plane and towards the disk drive base 110. Where such deformation exceeds the elastic range of the anchor tab material, it is referred to as "plastic deformation." For example, in the embodiment of FIG. 4, the anchor tab 236 is fabricated from metal (e.g. stainless steel, aluminum, etc), for example by stamping to define a T-shape in the top cover material to define the anchor tab 236. In the embodiment of FIG. 4, the anchor tab 236 preferably includes a bent region 528 where that anchor tab 236 has been plastically deformed out of the major plane of the top cover.

In the example embodiment shown in FIG. 4, the T-shaped anchor tab 236 has two hooking surfaces 422, 424—though the hooking surfaces 422, 424 are not oriented to be functional in the pre-deformation view of FIG. 4. By contrast, in the bent orientation as shown in FIG. 5, the hooking surfaces 422 and 424 of anchor tab 236 each face the top cover 120. That is, when the anchor tab 236 is in the bent orientation of FIG. 5, a normal vector that points away from the hooking surface 422 would also point towards the top cover 120. For example, in certain embodiments a maximum angular difference between a normal to the hooking surface 422 and a normal to the top cover plane is preferably no more then 30 degrees. Upon attachment of the top cover 120 to the disk drive base 110, the bent anchor tab 236 will protrude into a retention cavity of the disk drive base 110, and may then be further deformed (for example by further bending) to engage with a catching surface of that retention cavity.

Figure 6:
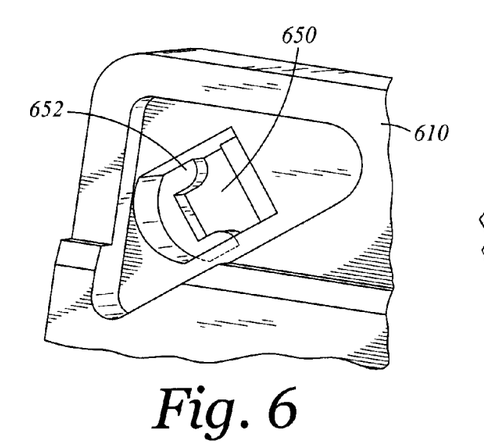
FIG. 6 is a close-up bottom view of a corner of a base for a disk drive, having a retention cavity, according to an embodiment of the present invention.

FIG. 6 is a close-up bottom view of a corner of disk drive base 610, having a retention cavity 650, according to an embodiment of the present invention. The retention cavity 650 includes a catching surface 652 that faces away from the top cover (e.g. top cover 120). That is, a normal vector that points away from the catching surface 652 would also point away from the top cover (e.g. top cover 120). For example, in certain embodiments a maximum angular difference between a normal to the catching surface 652 and a normal to the top cover plane is preferably no more then 30 degrees. Note that in the embodiment of FIG. 6, the retention cavity 650 comprises a hole (in the disk drive base 610) having a closed hole periphery, and the catching surface 652 is an internal feature of the hole.

Figure 7:
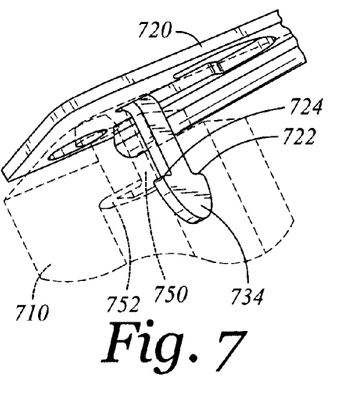
FIG. 7 is a close-up underside perspective view of a corner of a top cover for a disk drive, having an anchor tab shown after some deformation, and with the disk drive base shown in phantom lines, according to an embodiment of the present invention.
Figure 8:
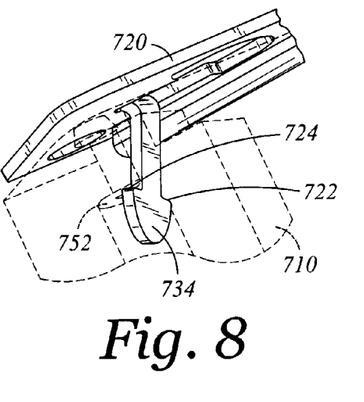
FIG. 8 is a close-up underside perspective view of a corner of a top cover for a disk drive, having an anchor tab shown after deformation has been completed, and with the disk drive base shown in phantom lines, according to an embodiment of the present invention.

FIG. 7 is a close-up underside perspective view of a corner of a top cover 720, having an anchor tab 734 shown after some deformation, and with a disk drive base 710 shown in phantom lines, according to an embodiment of the present invention. As shown in FIG. 7, hooking surfaces 722 and 724 of anchor tab 734 face the top cover 720. Anchor tab 734 protrudes into a retention cavity 750 of the disk drive base 710, and may then be further deformed (for example by further bending) so that hooking surfaces 722 and 724 contact and engage a catching surface 752 of retention cavity 750. FIG. 8 shows the anchor tab 734 after such further deformation by further bending. As shown in FIG. 8, anchor tab 734 has been further bent so that hooking surfaces 722 and 724 contact and engage a catching surface 752 of the retention cavity.

Figure 9:
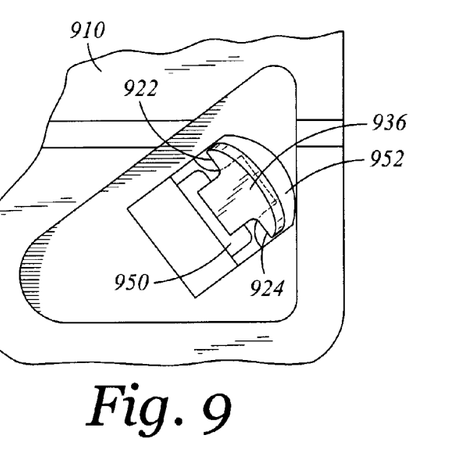
FIG. 9 is a close-up bottom view of a corner of a base for a disk drive, with a top cover anchor tab protruding into a retention cavity of the base and shown after deformation has been completed, according to an embodiment of the present invention.

FIG. 9 is a close-up bottom view of a corner of a disk drive base 910, with a top cover anchor tab 936 protruding into a retention cavity 950 of the base 910, and shown after deformation has been completed, according to an embodiment of the present invention. Note that in the embodiment of FIG. 9, the completed deformation is sufficient to put hooking surfaces 922, 924 of the anchor tab 936 in contact with the catching surface 952 of the retention cavity.

Figure 10:
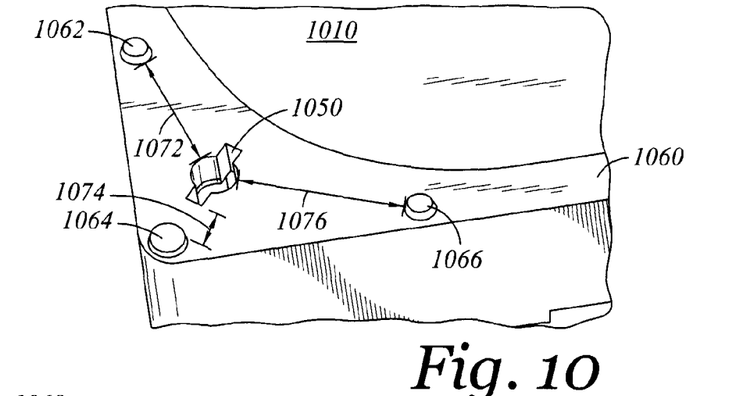
FIG. 10 is a close-up top perspective view of a corner of a base for a disk drive, having a retention cavity, according to an embodiment of the present invention.

FIG. 10 is a close-up top perspective view of a corner of a disk drive base 1010 having a retention cavity 1050, according to an embodiment of the present invention. The disk drive base 1010 includes a mating surface 1060 that faces a top cover (e.g. top cover 120). In the embodiment of FIG. 10, the disk drive base 1010 also includes a plurality of raised registration bumps 1062, 1064, 1066, each of which protrudes from the mating surface 1060 towards the top cover and comprises a location of contact with the top cover. Alternatively, the raised registration bumps may be integral to the top cover and protrude from the top cover towards the mating surface of the disk drive base. Preferably, gasket material is disposed between the mating surface 1060 and the top cover, with the gasket material not being present at the locations of contact between the raised registration bumps 1062, 1064, 1066 and the top cover (or alternatively between the raised registration bumps of the top cover and the mating surface of the disk drive base). Preferably but not necessarily, the gasket material is put in position on the mating surface 1060 or on the top cover in a liquid form and is then solidified (i.e. formed-in-place gasket). Note that such positioning and solidifying of the gasket material may be done well before the top cover is positioned with respect to the disk drive base.

In certain embodiments herein, the raised registration bumps may act as fulcrums to constrain plate bending of the top cover, thereby enabling the top cover to serve as a compressive spring to preload the anchor tab hooking surfaces against the retention cavity catching surfaces. In this regard, a minimum distance between each of the plurality of raised registration bumps 1062, 1064, 1066 and a closest retention cavity (i.e. retention cavity 1050) is preferably at least 6 mm. That is, in certain embodiments, the smallest of the distances 1072, 1074, 1076 is preferably at least 6 mm. Although such an inequality may cause the compressive spring rate of the top cover relative to the disk drive base to be insufficient to ensure continued tightness of conventional screw fasteners, the anchor tabs described herein may be significantly more reliable with regards to top cover retention under such circumstances (especially where the anchor tabs are engaged by so-called "plastic deformation" that exceeds the elastic range of the anchor tab material).

Figures 11, 12:
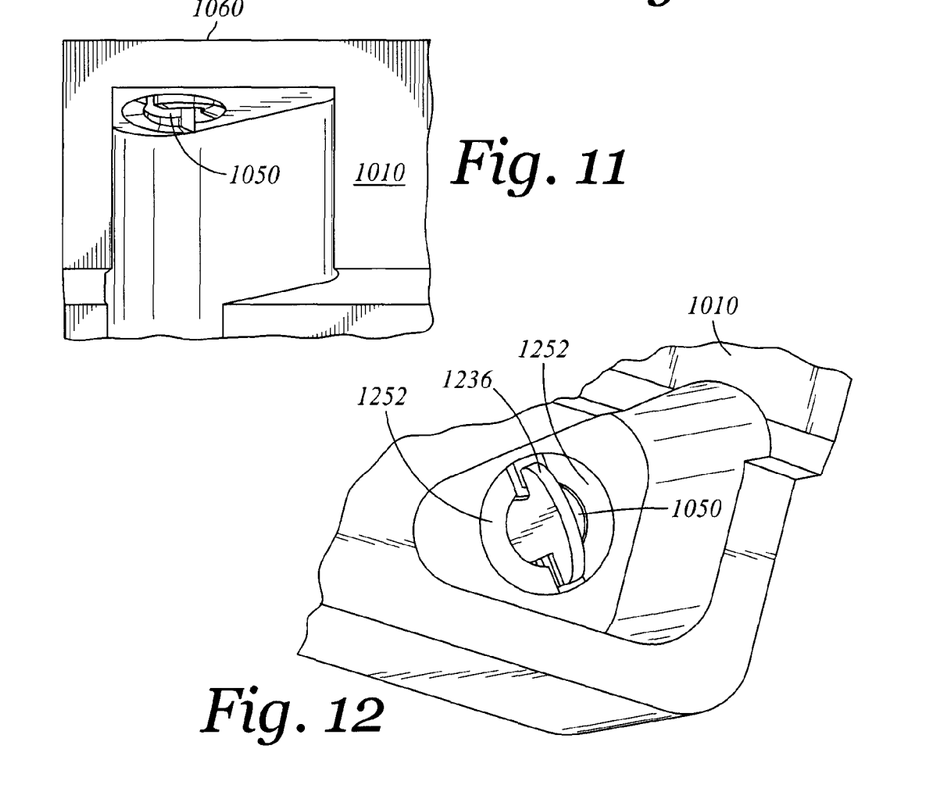
FIG. 11 is a close-up underside perspective view of a corner of a base for a disk drive, having a retention cavity, according to an embodiment of the present invention.
FIG. 12 is a close-up bottom perspective view of a corner of a base for a disk drive, with a top cover anchor tab protruding into a retention cavity of the base and shown before deformation has been completed, according to an embodiment of the present invention.

FIG. 11 is a close-up underside cut-away perspective view of retention cavity 1050 of disk drive base 1010. Note that in the embodiment of FIG. 11, the retention cavity 1050 includes catching surfaces around the outer periphery of the retention cavity 1050 that take the shape of slightly inclined circumferential ramps. For example, in certain embodiments the slightly inclined circumferential ramps define an incline with respect to the major plane of the top cover that is preferably between 10 and 20 degrees.

Figure 13:
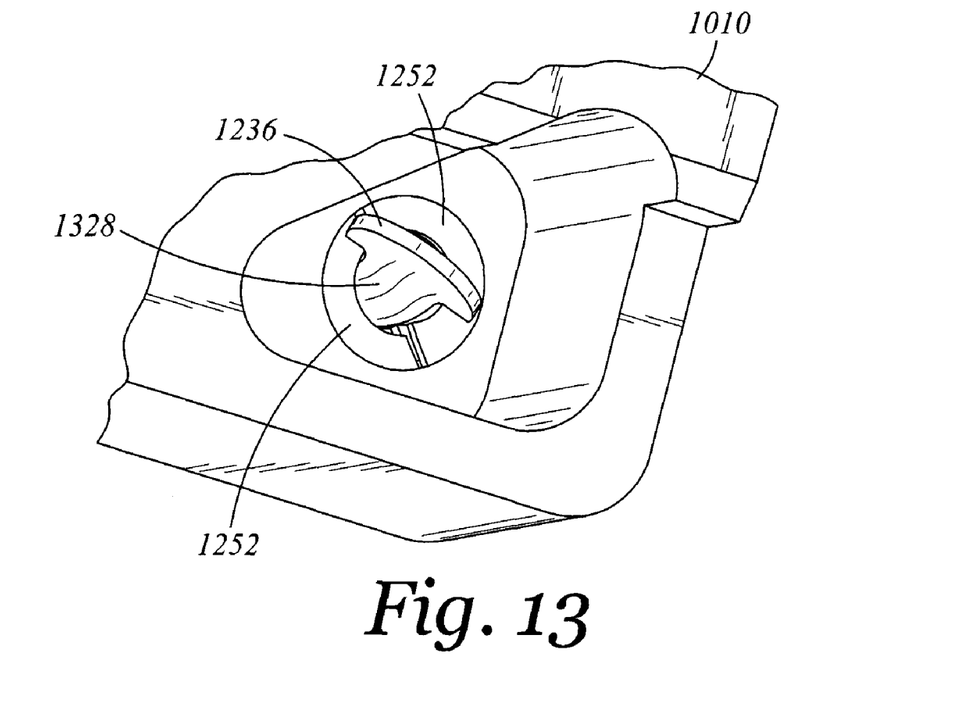
FIG. 13 is a close-up bottom perspective view of a corner of a base for a disk drive, with a top cover anchor tab protruding into a retention cavity of the base and shown after deformation has been completed, according to an embodiment of the present invention.

FIG. 12 is a close-up bottom perspective view of a corner of the disk drive base 1010, with a top cover anchor tab 1236 protruding into the retention cavity 1050, and shown before deformation of the anchor tab 1236 has been completed. That is, in the embodiment of FIG. 12, the anchor tab 1236 has been deformed by bending sufficiently to protrude into the retention cavity 1050, but has not yet been twisted so that any hooking surfaces of the anchor tab 1236 contact the catching surfaces 1252 of the retention cavity 1050. However, in FIG. 13 the anchor tab 1236 is shown after having been deformed by twisting sufficiently for the hooking surfaces of the anchor tab 1236 to be contacting and engaged with the catching surfaces 1252 of the retention cavity. Note that in FIG. 13, anchor tab 1236 includes a twisted region 1328 where the geometry of anchor tab 1236 is twisted about an axis that is approximately normal to the top cover plane.

Figure 14:
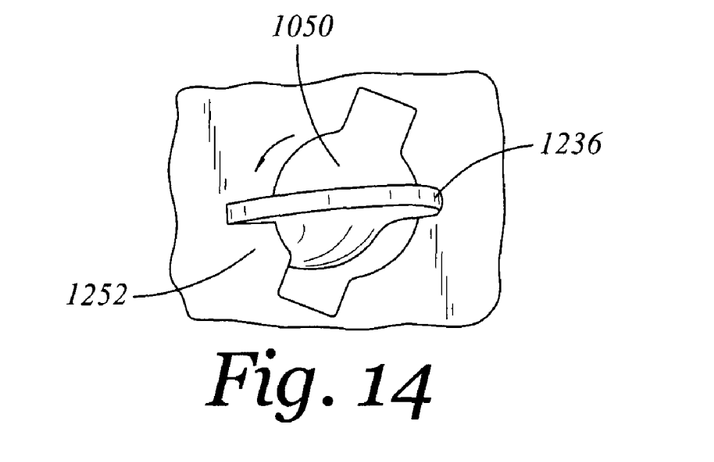
FIG. 14 depicts the twisting deformation of an anchor tab according to an embodiment of the present invention.

FIG. 14 depicts further twisting of the anchor tab 1236 about an axis that is normal to the plane of the major surface of the top cover, beyond the elastic range of the anchor tab material (a twisting plastic deformation), sufficient to engage the anchor tab 1236 with the disk drive base (i.e. the hooking surfaces of the anchor tab 1236 are in contact with the catching surfaces 1252 of the retention cavity 1050). Preferably, the top cover (e.g. top cover 120) is compressed towards the disk drive base 1010 for a period, and the anchor tab 1236 is deformed during the period but only to the extent necessary for the hooking surfaces of the anchor tab 1236 to be brought into contact with the catching surfaces of the retention cavity 1050. Assembly by this preferred method may advantageously reduce debris created by translation of the hooking surface over the catching surface during deformation of anchor tab 1236.

Preferably, such compression is at least partially accomplished by a compression force that is applied to the top cover at a force application location that is closer to retention cavity 1050 (and therefore closer to anchor tab 1236) than is a nearest one of the plurality of raised registration bumps (e.g. a nearest one of raised registration bumps 1062, 1064, 1066 shown in FIG. 10). For example, in the embodiment of FIG. 10, the force application location would preferably be either at the location of retention cavity 1050 or somewhere in the region between retention cavity 1050 and the periphery of a triangle defined by the three raised registration bumps 1062, 1064, 1066.

Figures 15, 16:
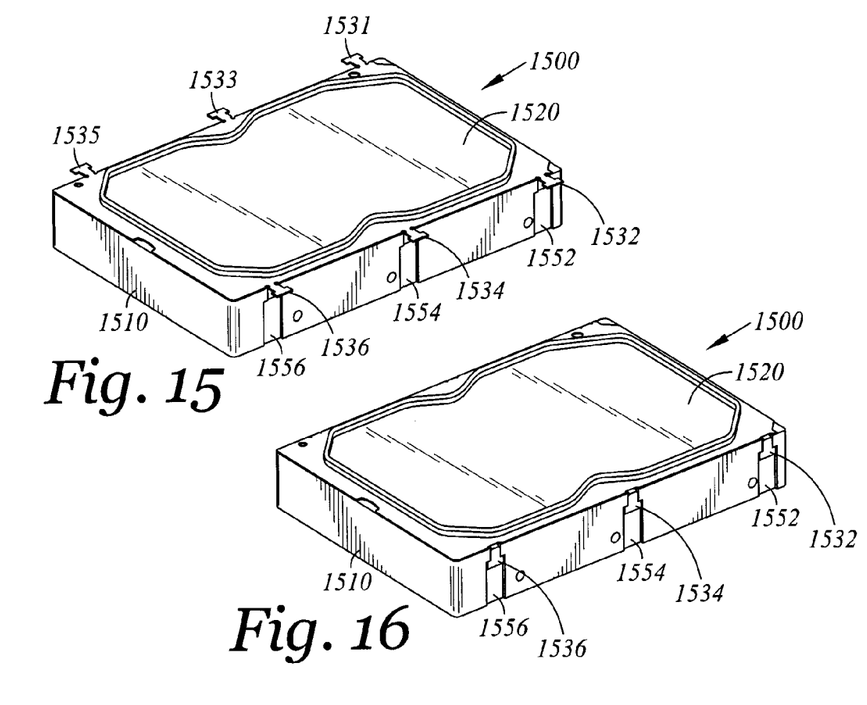
FIG. 15 is a top perspective view of a disk drive, with a top cover of the disk drive housing having a plurality of anchor tabs (shown before deformation) and with a disk drive base having a plurality of side anchor cavities, according to an embodiment of the present invention.
FIG. 16 is a top perspective view of the disk drive of FIG. 15 after deformation of the top cover anchor tabs.

FIG. 15 is a top perspective view of a disk drive 1500, with a top cover 1520 of the disk drive housing having a plurality of anchor tabs 1531-1536 (shown before deformation) and with a disk drive base 1510 having a plurality of side anchor cavities (including side anchor cavities 1552, 1554, 1556), according to an embodiment of the present invention. FIG. 16 is a top perspective view of the disk drive 1500 of FIG. 15 after bending deformation of the top cover anchor tabs 1531-1536. Note that, in the embodiment of FIGS. 15-16, each of the plurality of retention cavities (including side anchor cavities 1552, 1554, 1556) comprises a slot in the disk drive base 1510 having a slot periphery that is open to a side of the disk drive base 1510, and that the catching surface of each of the plurality of retention cavities is an internal feature of the slot.

Figure 17:
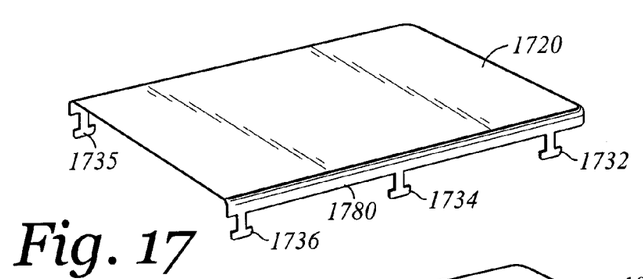
FIG. 17 is a top perspective view of top cover for a disk drive, having a plurality of anchor tabs (shown before deformation), according to an embodiment of the present invention.

FIG. 17 is a top perspective view of top cover 1720, having a plurality of anchor tabs shown before deformation (including anchor tabs 1732, 1734, 1736, and 1735), according to an embodiment of the present invention. Note that the top cover 1720 includes a peripheral flange 1780 that is bent out of the top cover plane, and that may help the disk drive enclosure to shield electromagnetic energy. In the embodiment of FIG. 17, each of anchor tabs 1732, 1734, and 1736 is an integral portion of the peripheral flange 1780. Whereas in the embodiment of FIG. 4 the metal anchor tab 236 preferably includes a bent region 528 (where that anchor tab 236 is bent out of the top cover plane), in the embodiment of FIG. 17 the anchor tabs are already oriented out of the major plane of the top cover (by virtue of the out-of-plane orientation of the peripheral flange), and so do not need to be subsequently bent out of that plane. Accordingly, the subsequent deformation of the anchor tabs 1732, 1734, 1736, and 1735 required to engage the catching surfaces may be temporary and/or purely in the elastic range. The embodiment of FIG. 18 shares this characteristic.

Figure 18:
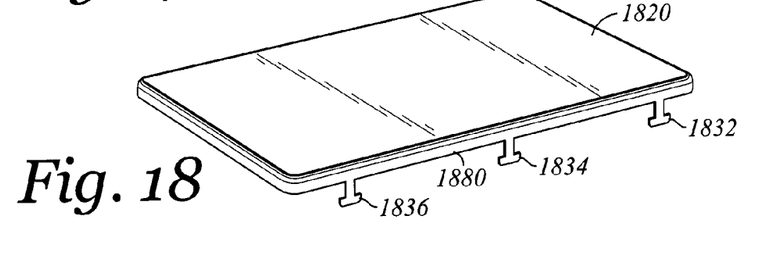
FIG. 18 is a top perspective view of top cover for a disk drive, having a plurality of anchor tabs (shown before deformation), according to an embodiment of the present invention.

FIG. 18 is a top perspective view of top cover 1820, having a plurality of anchor tabs shown before deformation (including anchor tabs 1832, 1834, and 1836), according to an embodiment of the present invention. Note that the top cover 1820 includes a peripheral flange 1880 that is bent out of the top cover plane, and that may help the disk drive enclosure to shield electromagnetic energy. In the embodiment of FIG. 18, each of anchor tabs 1832, 1834, and 1836 is an integral portion of the peripheral flange 1880. The integral nature of the anchor tabs may reduce the total part count in the disk drive product, which, in a high-volume manufacturing environment, may significantly reduce assembly and inventory complexity, and associated time and costs.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. "Comprising," "including," and "having," are intended to be open-ended terms.

What is claimed is:

1. A disk drive comprising:
a disk drive base;
a spindle attached to the disk drive base;
a disk attached to the spindle; and
a top cover attached to the disk drive base to form a housing that encloses the disk, the top cover having a major surface defining a top cover plane, the top cover including a plurality of anchor tabs extending away from the top cover plane and towards the disk drive base, each of the plurality of anchor tabs including a hooking surface that faces the top cover, the plurality of anchor tabs being integral features of the top cover so that the top cover and the plurality of anchor tabs are a single monolithic component having material continuity rather than being an assembly of sub-components;
wherein the disk drive base includes a plurality of retention cavities, each of the retention cavities including a catching surface that faces away from the top cover;
wherein each of the plurality of anchor tabs protrudes into a respective one of the plurality of retention cavities, with the hooking surface of the anchor tab being in contact with the catching surface of the retention cavity.

2. The disk drive of claim 1 wherein the disk drive base includes a mating surface that faces the top cover, and further comprising a plurality of raised registration bumps each including a location of contact between the mating surface and the top cover, and further comprising gasket material between the mating surface and the top cover, the gasket material not being present at the location of contact.

3. The disk drive of claim 2 wherein each of the plurality of raised registration bumps protrudes from the mating surface towards the top cover.

4. The disk drive of claim 2 wherein each of the plurality of raised registration bumps protrudes from the top cover towards the mating surface.

5. The disk drive of claim 2 wherein a minimum distance between each of the plurality of raised registration bumps and each of the plurality of retention cavities is at least 6 mm.

6. The disk drive of claim 1 wherein, for each of the plurality of anchor tabs, a maximum angular difference between a normal to the hooking surface and a normal to the top cover plane is no more then 30 degrees.

7. The disk drive of claim 1 wherein, for each of the retention cavities, a maximum angular difference between a normal to the catching surface and a normal to the top cover plane is no more then 30 degrees.

8. The disk drive of claim 1 wherein each of the plurality of anchor tabs comprises a metal material and includes a bent region where that anchor tab is bent out of the top cover plane.

9. The disk drive of claim 1 wherein the top cover includes a peripheral flange that is bent out of the top cover plane, and wherein at least one of the plurality of anchor tabs is an integral portion of the peripheral flange.

10. The disk drive of claim 1 further comprising at least one screw fastener attaching the top cover to the disk drive base.

11. The disk drive of claim 1 wherein each of the plurality of retention cavities comprises a hole through the disk drive base having a closed hole periphery, and wherein for each of the plurality of retention cavities, the catching surface is an internal feature of the hole.

12. The disk drive of claim 1 wherein each of the plurality of retention cavities comprises a slot in the disk drive base having a slot periphery that is open to a side of the disk drive base, and wherein, for each of the plurality of retention cavities, the catching surface is an internal feature of the slot.

13. The disk drive of claim 1 wherein each of the plurality of anchor tabs is T-shaped and includes a twisted region where the anchor tab is twisted about an axis that is approximately normal to the top cover plane.

14. A method for assembling a disk drive comprising:
providing a disk drive base that includes a plurality of retention cavities;
attaching a spindle to the disk drive base;
providing a top cover having a plurality of anchor tabs that extend away from a plane of a major surface of the top cover, the plurality of anchor tabs being integral features of the top cover so that the top cover and the plurality of anchor tabs are a single monolithic component having material continuity rather than being an assembly of sub-components, each of the plurality of anchor tabs including a hooking surface that faces the top cover;
positioning the top cover in relative alignment with the disk drive base, with each of the plurality of anchor tabs protruding into a respective one of the plurality of retention cavities, so as to create a housing that at least partially encloses the spindle,
deforming each of the plurality of anchor tabs so that its hooking surface contacts a catching surface of the respective one of the plurality of retention cavities, the catching surface facing away from the top cover.

15. The method of claim 14 wherein deforming comprises plastic deformation of the anchor tab.

16. The method of claim 15 wherein deforming comprises a twisting plastic deformation about an axis that is normal to the plane of the major surface of the top cover.

17. The method of claim 14 wherein the disk drive base includes a mating surface that faces the top cover, and wherein the disk drive further comprises a plurality of raised registration bumps each including a location of contact between the mating surface and the top cover, and further comprising putting a gasket material between the mating surface and the top cover but not at the location of contact of any of the plurality of raised registration bumps.

18. The method of claim 17 wherein putting the gasket material in the position between the mating surface and the top cover comprises positioning the gasket material in a liquid form and then solidifying the gasket material.

19. The method of claim 17 wherein positioning the top cover in relative alignment with the disk drive base further comprises compressing the top cover towards the base for a period, and wherein deforming each of the plurality of anchor tabs is accomplished during the period but only to the extent necessary for the hooking surface of the anchor tab to be brought into contact with the catching surface of the retention cavity.

20. The method of claim 19 wherein the compressing is at least partially accomplished by a compression force that is applied to the cover at a force application location that is closer to one of the plurality of anchor tabs than is a nearest one of the plurality of raised registration bumps.

21. The method of claim 14 wherein positioning the top cover in relative alignment with the disk drive base further comprises compressing the top cover towards the base for a period, and wherein deforming each of the plurality of anchor tabs is accomplished during the period but only to the extent necessary for the hooking surface of the anchor tab to be brought into contact with the catching surface of the retention cavity.

22. The method of claim 21 wherein the compressing is at least partially accomplished by a compression force that is applied to the cover at a force application location that is closer to one of the plurality of anchor tabs than is a nearest one of the plurality of raised registration bumps.

23. The method of claim 14 wherein the plurality of anchor tabs is formed in the top cover by stamping.

* * * * *